DANIEL A. JOHNSON.
Improvement in Device for Attaching Wheels to Vehicles.

No. 127,607. Patented June 4, 1872.

Witnesses,
N. W. Stearns
H. J. Cambridge

Inventor,
Daniel A. Johnson

UNITED STATES PATENT OFFICE.

DANIEL A. JOHNSON, OF BOSTON, ASSIGNOR TO HIMSELF AND JOHN OSGOOD FROST, OF CHELSEA, MASSACHUSETTS.

IMPROVEMENT IN DEVICES FOR ATTACHING WHEELS TO AXLES.

Specification forming part of Letters Patent No. 127,607, dated June 4, 1872.

*To all whom it may concern:*

Be it known that I, DANIEL A. JOHNSON, of Boston, in the county of Suffolk and State of Massachusetts, have invented an Improvement in Wheel-Couplings for Carriages, of which the following is a full, clear, and exact description, reference being had to the accompanying drawing making part of this specification, in which—

Figure 1:
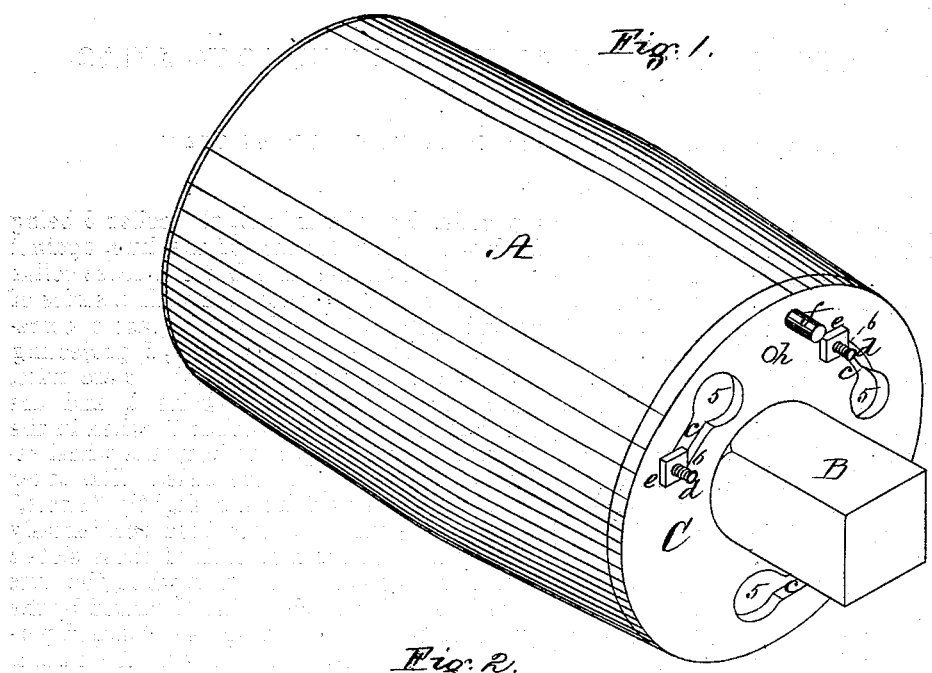
Figure 2:
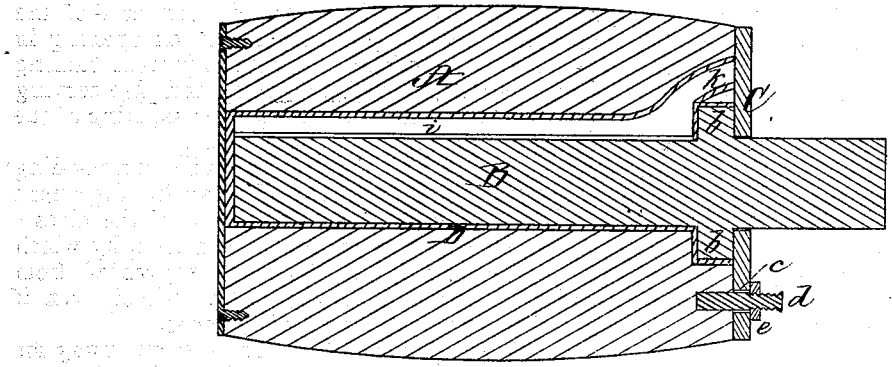
Figure 3:
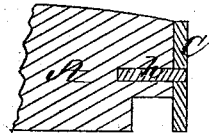

Figure 1 is a perspective view of the hub of a wheel and its axle connected by my improved coupling. Fig. 2 is a longitudinal section through the center of the same; Fig. 3, sectional detail.

My invention relates to that class of wheel-couplings having a revolving collar or circular plate, which is placed on the axle inside of the stationary collar, at the inner end of the journal, and is secured to the inner end of the hub, against which it abuts, by means of a series of screws and nuts. This method of securing the wheel is, however, objectionable, as the removing and replacing of the nuts is inconvenient and consumes considerable time, while the nuts are liable to be mislaid or lost, and the threads of the screws are often injured by not properly starting the nuts thereon.

My invention has for its object to overcome these difficulties; and consists in providing the revolving collar or plate, which holds the wheel in place, with slots, through which pass the screw-bolts projecting from the inner face of the hub, one end of each slot being enlarged, so that when the collar is turned sufficiently to bring the enlarged portions of the slots in line with the screw-bolts the wheel may be taken off without removing the nuts thereon, which only require to be loosened to allow of the collar being turned.

To enable others skilled in the art to understand and use my invention, I will proceed to describe the manner in which I have carried it out.

In the said drawing, A represents the hub of a wheel provided with a circular recess at its inner end for the reception of the stationary collar $b$ of the axle B, the collar $b$ being flush with the inner face of the hub, against which and over the axle B fits a loose collar or circular plate, C, provided with a series of curved slots, $c$, through which pass a corresponding number of screw-bolts, $d$, projecting from the inner end of the hub. $e$ are nuts, which fit over the screw-bolts $d$, and are brought down upon the collar C, when in the position seen in Fig. 1, to keep the wheel securely in place upon the axle. The outer ends of the screw-bolts are slightly "upset," so as to prevent the nuts from accidentally coming off. One end of each of these slots $c$ is enlarged at 5, in order that when the nuts $e$ are loosened, and the collar C turned by the pin or projection $f$ to bring the enlarged portions 5 of the slots $c$ in line with the nuts $e$, the wheel may be taken off and replaced without removing the nuts, which readily pass through the enlarged portions 5 of the slots. $h$ is a pin, fitting into an opening in the loose collar C to prevent it from turning independently of the wheel, and also serving as a guide to insure the proper securing of the wheel to the collar C.

If preferred, the pin $h$ and corresponding opening in the collar C may be dispensed with, and the smaller ends 6 of the slots $c$ countersunk to receive the nuts $e$, by which means the collar C will be prevented from turning independently of the wheel, even if the nuts should be slightly loose.

The interior of the hub A is cut away for the reception of the journal-box D and its enlargement, which forms a chamber, $i$, extending longitudinally from one end of the journal-box to the other, and opening into it throughout its entire length. This chamber $i$ is supplied with oil through an inclined passage, $k$, the mouth of which is closed by the collar C when in the position seen in Fig. 1.

This construction facilitates the distribution of the oil, and admits of a flexible rod or probe being introduced through the passage $k$ into the chamber $i$, for the purpose of removing the dirt from the longitudinal groove in the journal, without the necessity of removing the wheel from the axle.

*Claim.*

What I claim as my invention, and desire to secure by Letters Patent, is—

The loose collar C with its slots c provided with enlarged portions 5, in combination with the hub A, bolts d extending from the hub, and nuts e outside of the plate C, operating substantially in the manner and for the purpose set forth.

Witness my hand this 26th day of April, A. D. 1872.

DANIEL A. JOHNSON.

In presence of—
 N. W. STEARNS,
 W. J. CAMBRIDGE.